Jan. 19, 1954 R. S. RICHARDSON 2,666,347
GANG SAW SWAGING MACHINE
Filed Feb. 19, 1952 2 Sheets-Sheet 2
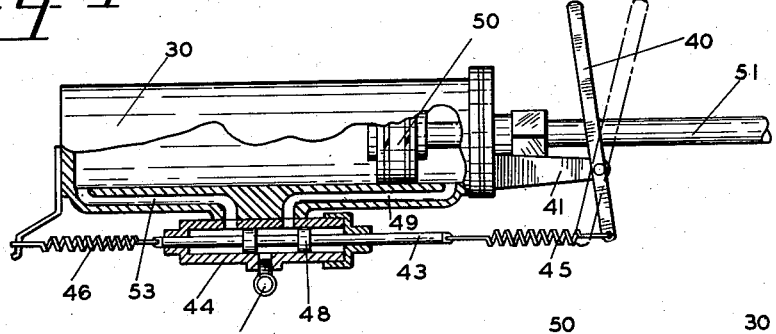
Fig. 4
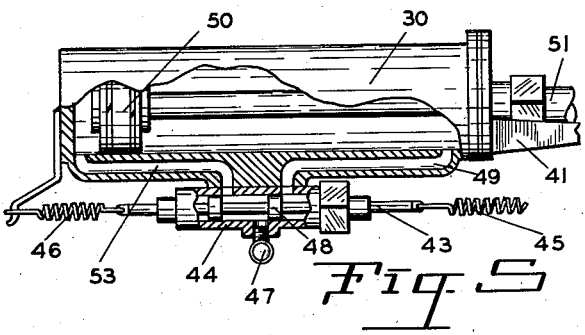
Fig. 5
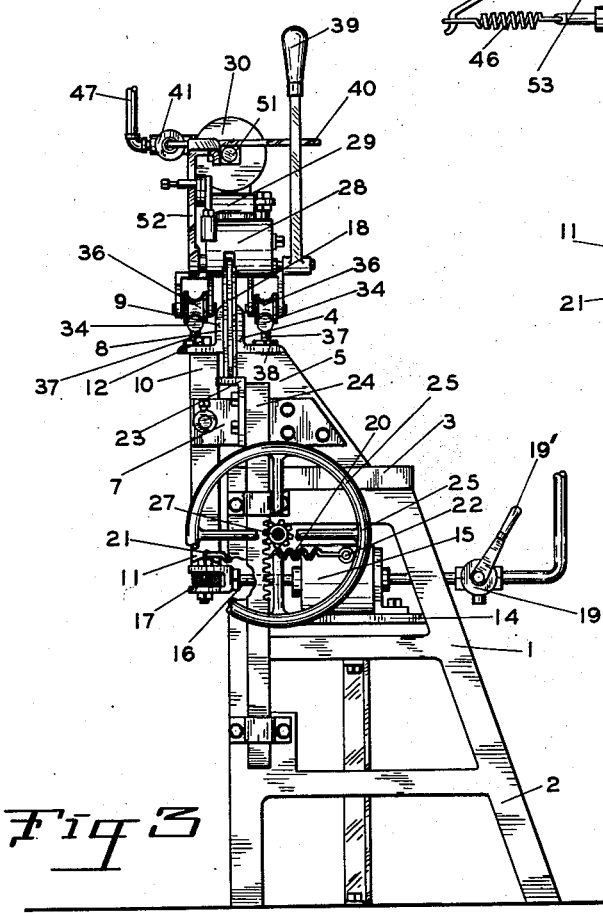
Fig. 3
Fig. 6
INVENTOR.
RALPH S. RICHARDSON
BY
ATTORNEY Patented Jan. 19, 1954

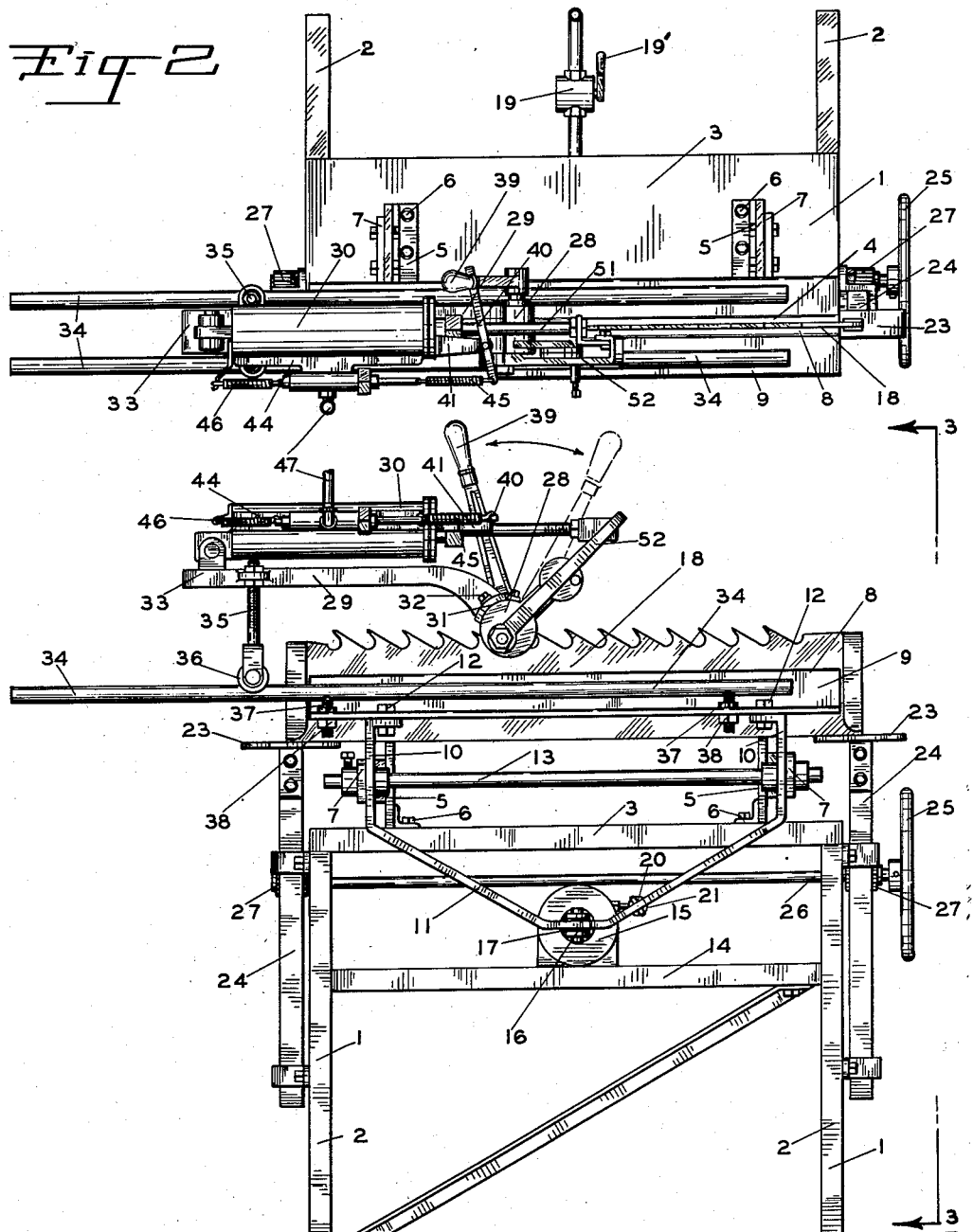

2,666,347

UNITED STATES PATENT OFFICE 2,666,347

GANG SAW SWAGING MACHINE

Ralph S. Richardson, Sweet Home, Oreg.

Application February 19, 1952, Serial No. 272,307

4 Claims. (Cl. 76—52)

My invention relates to improvements in gang saw swaging machines, and is particularly related to the saw clamping means and means for guiding the swaging device along the teeth in the swaging operation.

The primary object of the invention is to provide a clamp for holding the saw, which is operated by an air cylinder, the said air cylinder holding the clamp in closed position on the saw while swaging the teeth.

A further object of the invention is the providing of guide rails for supporting the swage in relation to the saw teeth in the swaging operation.

Another object of my invention is in the construction of the operating mechanism and swage whereby when the swage is located on the tooth and the control lever has been operated to lock the swage on the said tooth, the swaging lever will automatically be brought into operation swaging the tooth, after which the locking lever is released from the tooth and the swage moved forward on the guide rails by the operator to be again placed on the next tooth for swaging the same.

These and other incidental objects will be apparent in the drawings, specification and claims.

Referring to the drawings:

Figure 1 is a side view of my new and improved swaging machine.

Figure 2 is a plan view of Figure 1.

Figure 3 is an end view of Figure 1, taken on line 3—3, parts broken away for convenience of illustration.

Figure 4 is an enlarged detail view of the air cylinder and its control, parts broken away for convenience of illustration. This is the position corresponding to Figures 1 and 2 wherein the swaging lever is about to be operated.

Figure 5 is the same as Figure 4, except that the swaging lever has been operated by its operating piston, and is about to be returned to the position shown in Figures 1, 2 and 4.

Figure 6 is a detailed enlarged view of the air cylinder for operating the movable clamping member for holding the saw.

Referring more specifically to the drawings:

My new and improved swaging machine consists of a base or frame 1, consisting of supporting legs 2 and a top 3. A stationary clamping member 4 is supported upon the brackets or legs 5, which in turn are secured to the top of the frame 3 by any suitable means, as bolts 6. Extending forwardly from the legs 5 are brackets 7, which support the movable clamping member 8.

The movable clamping member 8 consists of an angle bar 9, which is fixedly secured to the legs 10 of the U-shaped lever 11, as by bolts 12, referring particularly to Figures 1 and 3. The legs of the lever 10 are journalled to the cross shaft 13, which is fixely secured to the brackets 7. The said shaft 13 providing a pivot point for the movable jaw assembly.

Fixedly secured to the framework 14 of the base 1 is an air cylinder 15. The piston rod 16 of the air cylinder is pivotally connected to the lever 11 at 17, and is adapted to pivot the lever 11 about the pivot shaft 13, moving the clamping member 8 away or towards the stationary jaw 4.

The air cylinder 15 receives its air supply through a pipe line 18 through a valve 19. The valve 19 admits air into the cylinder when the lever 19' is in the position shown in Figure 3, and it exhausts the air from the cylinder 15 through exhaust port, not shown. The air may be entirely shut off from the cylinder when the lever 19' is in a position midway between the said positions above described.

A spring 20, having its one end connected at 21 to the lever 11, and its opposite end connected to the cylinder 15 at 22, pulls the lever towards the cylinder pivoting the said lever about its pivot shaft 13, moving the clamping member 8 away from the stationary clamping member 4. This spring tends to separate the clamping members 4 and 8 at all times, except when the air within the cylinder 15 overcomes the tension of the said spring, closing the clamping members by pivoting the lever 11 about its piston 13.

The saw to be clamped between the clamping members 4 and 8 is indicated by the letter A. The elevation of the saw between the clamping members is determined by the position of the supporting brackets 23, which are fixedly secured to the upper end of the gear racks 24 by any suitable means, referring particularly to Figures 1, 2 and 3. The elevation of the racks 24 are adjusted by the hand wheel 25, which revolves the shaft 26 and the pinions 27, raising or lowering the brackets 23 and the saw A to the desired height between the jaws 4 and 8. To take care of the various lengths of saws being conditioned, the clamping members 4 and 8 may be easily interchanged with longer or shorter clamping members by removing them from the legs 10 of the lever 11, referring to Figure 1.

A swaging tool 28 is connected to a carriage 29 at 31 by the set screw 32. The opposite end 33 of the carriage 29 is supported on rails 34 by way of the adjustable legs 35. The lower ends of the legs having grooved wheels 36 operating on the rails 34. The rails 34 are supported by and connected to the angle bars of the clamping members 4 and 8 by the threaded post 37, the post forming part of the rails and passing through holes in the angles and being adjustably locked to the angle bars by the lock nuts 38. The grooves within the wheels 36 are of sufficient width to allow the stationary clamping member 8 and the rail 34 to move without effecting the support of the carriage 29. As a matter of fact, the movement of the stationary clamping member 8 is so slight that it is hardly noticeable.

The swaging tool 28 has the usual control lever 39 for locking the swage to the tooth to be swaged. The swaging lever 52, instead of being operated by hand as in the usual case, is operated by an air cylinder 30 which is pivotally mounted to the carriage 29 at 30'. The piston rod 51 of the air cylinder 30 is pivotally connected to the swaging lever 52 by a special pivot connection 52'. A piston 50 is connected to the piston rod 51 and operates in the cylinder 30, referring particularly to Figures 4 and 5.

The position of this piston is controlled by a special air control valve 44. A piston rod 43 operates within this valve and has pistons 48 forming part thereof. An air supply line 47 enters the body of the valve 44 between the pistons 48. When the valve is in the position shown in Figure 4, air will enter between the pistons 48 into the manifold 49 and behind the piston 50. This will move the piston rod 51 in the direction of the arrow, pulling the swaging lever 52 for swaging the tooth.

A valve operating lever 40 is pivotally mounted to the bracket 41 at 41'. A spring 45 is connected to one end of this valve operating lever at 45', the opposite end of the spring being connected to the piston rod 43 of the valve 44. When the control lever 39 is brought to the position shown in Figures 1 and 2, it rocked the valve operating lever 40 on its pivot to the position shown in Figure 4, thus setting the valve 44 in position to drive the piston forward as indicated in Figure 5 to operate the swaging device.

In Figure 5, the valve is about to return the piston 50 to that position shown in Figure 4, air entering between the valve pistons 48 and into the manifold 53 against the piston 50, which will return the swaging lever 52 to the position shown in Figures 1 and 2. When the lever 40 is released by freeing it from the control lever 39, the spring 46 will return the piston rod 43 of the valve 44 to the position shown in Figure 5.

I will now describe the operation of my new and improved gang saw swaging tool. The movable clamping member 8 will be in open position due to the pull of the spring 20 on the lever 11, which pivots the said lever about its pivot shaft 13. In the event the air supply has been shut off from the pipe 18 to the cylinder 15, but in the event the lever 19' was in the position shown in Figure 3, the lever would first have to be moved to actuate the valve to exhaust position, exhaust the air from the cylinder 15, at which time the spring would open the movable clamping member 8.

When the clamps have been separated the gang saw A is dropped in place, coming to rest on the supporting brackets 23. The hand wheel 25 would then be rotated to either raise or lower the said brackets until the saw was brought to the proper elevation, then the valve lever 19' would be moved to the position shown in Figure 3, which would apply air to the cylinder 15, forcing its piston rod 16 towards the lever 11, pivoting the said lever about its pivot shaft 13, closing the movable clamping member 8 against the saw and the stationary clamping member 4. The lever 19' will remain in this position, applying a constant air pressure within the cylinder 15, holding the clamping members tightly closed.

In the operation of the swage 28, the swage is dropped down over the desired tooth of the saw, the control lever 39 is forced forward towards the cylinder 39, clamping the swage to the tooth in question and striking the valve operating lever 40, positioning the air valve 44 in the position shown in Figure 4. Air will enter from the pipe 47 between the pistons 48, through the manifold 49, behind the piston 50, forcing the same to the left and pulling the swaging lever 50 therewith, swaging the tooth.

Next the operator will pull the control lever 39 to the right releasing the swage from the tooth, permitting the lever 40 to take the broken line position, Figure 4, permitting the spring 46 to position the valves 48 as indicated in Figure 5, allowing air to enter from the pipe 47 into the manifold 53, behind the piston 50 forcing the piston rod 51 to the right, together with the swaging lever 52. The operator then lifts the swage up and over to the next tooth, at which time he will force the control lever 39 forward repeating another cycle of operation.

The exhaust air from the cylinder 30 can escape by the valve piston rod 43 as its guides are loose fitting. My clamp and swage are quick of action with ease of operation.

What I claim is:

1. A swaging machine, comprising a saw clamp, means for operating the saw clamp, a track, a carriage mounted on the track, a swaging device mounted on the carriage above the clamp including a control lever and a swaging lever, fluid operated means including a valve, a cylinder pivoted at one end to the carriage, a piston in the cylinder, and a piston rod pivotally connected to the swaging lever, a pivotally mounted valve operating lever connected to the valve, one end of said valve operating lever being in the path of movement of the control lever, whereby when the control lever is operated it will operate the valve operating lever to admit pressure to advance the piston and actuate the swaging lever to swage a tooth held by the clamp, and means for reversing the valve to return the piston and swaging lever to normal position when the control lever is returned to normal position.

2. A swaging machine, as defined in claim 1, wherein the means for operating the clamp consists of a pivotally mounted yoke connected at its upper end to the clamp, a fluid operated piston and piston rod, the piston rod being pivoted to the yoke, a fluid supply pipe for supplying fluid to the piston, a valve in the pipe for controlling the fluid, and a spring for returning the yoke to normal position when fluid pressure is relieved from the piston.

3. A swaging machine, comprising a frame, a fixed clamping member, a movable clamping member, rails carried by the clamping members, a carriage mounted on the rails, swaging mechanism mounted on the carriage above the clamping members, a yoke secured to and depending from the movable clamping member, a shaft on the frame on which the yoke is mounted, a piston rod pivoted to the lower end of the yoke, a piston on the rod, a cylinder to receive the piston, a fluid supply pipe communicating with the rear end of the cylinder to force the piston in one direction to close the clamping members to permit use of the swaging device in any position throughout the length of the clamping members, a valve in the pipe to control the admission and exhaustion of fluid in the cylinder, and a spring attached at one end to the cylinder and at its opposite end to the yoke to return the yoke and movable clamp to normal position when fluid is exhausted from the cylinder.

4. A swaging machine, comprising a clamp, a pair of rails mounted on the clamp, a carriage having depending legs provided with rollers which ride on the rails, a swaging device supported on the carriage including a swaging lever and a control lever, a cylinder mounted on the carriage, a piston in the cylinder, a rod connected to the piston and pivoted at its outer end to the swaging lever, a valve for controlling fluid pressure in the cylinder including a stem, a valve operating lever pivotally mounted on the cylinder and having one end in the path of movement of the control lever, a spring attached at one end to the end of the pivotally mounted valve operating lever and its other end attached to one end of the stem, a second spring connected to the opposite end of the stem, whereby when the control lever is operated it will swing the valve operating lever and actuate the valve to admit fluid pressure to the piston and to actuate the swaging device, and upon reversal of the movement of the control lever the spring connected to the stem and the cylinder will operate the valve for fluid to release the swaging lever.

RALPH S. RICHARDSON.

References Cited in the file of this patent
UNITED STATES PATENTS

| Number | Name | Date |
|---|---|---|
| 1,653,827 | Trimble | Dec. 27, 1927 |
| 1,732,217 | Breest et al. | Oct. 22, 1929 |
| 1,824,349 | Horton et al. | Sept. 22, 1931 |
| 1,863,910 | Morey | June 21, 1932 |
| 2,190,920 | Hanchett | Feb. 20, 1940 |